United States Patent [19]

Tidwell

[11] 4,119,272
[45] Oct. 10, 1978

[54] MOBILE AGRICULTURAL IRRIGATION APPARATUS

[76] Inventor: Hubert Tidwell, P.O. Box 57, Wellington, Utah 84542

[21] Appl. No.: 771,262

[22] Filed: Feb. 23, 1977

[51] Int. Cl.² .............................................. B05B 3/18
[52] U.S. Cl. .................................... 239/178; 239/199
[58] Field of Search .............. 239/160, 178, 183, 188, 239/189, 191, 199; 137/344, 355.12, 355.26

[56] References Cited

U.S. PATENT DOCUMENTS

| 1,176,856 | 3/1916 | Salmond | 239/189 |
| 1,784,251 | 12/1930 | Plumer | 239/199 X |
| 2,122,596 | 7/1938 | Turner | 239/189 |
| 2,570,573 | 10/1951 | Liboiron | 239/178 |
| 2,974,876 | 3/1961 | Poynor et al. | 239/183 |

FOREIGN PATENT DOCUMENTS 332,308  1/1921  Fed. Rep. of Germany .......... 239/191

Primary Examiner—Johnny D. Cherry
Attorney, Agent, or Firm—B. P. Fishburne, Jr.

[57] ABSTRACT

A self-contained and self-propelled irrigation apparatus for row crops embodies a comparatively short closed end apertured irrigation boom which receives water through the tubular shaft of a hose reel mounted on the boom. The boom and hose reel are carried by a wheeled support which includes widely spaced traction wheels and a center stabilizing wheel. A platform on the boom mounts an engine and drive trains for the traction wheels and hose reel.

4 Claims, 3 Drawing Figures

MOBILE AGRICULTURAL IRRIGATION APPARATUS

BACKGROUND OF THE INVENTION

The prior art includes many teachings on stationary and mobile agricultural sprinklers and irrigators. These teachings range from massive rotary sprinkler heads mounted at intervals on stationary pipe lines in a field to extremely long self-propelled traversing sprinkler or irrigation booms which may travel in a circular path around a fixed source of water or in a linear path across a field while receiving water through a hose or hoses connected with some stationary source of water.

The present invention relates broadly to the latter type of linear traversing agricultural irrigators but is intended to fill a need which heretofore has not been satisfied by the prior art.

The commonly used linear traversing irrigator has a irrigation boom which may be as much as one-quarter mile long and which requires multiple spaced supporting and/or traction wheel units as well as couplings with supply hoses. Also a very expensive system of truss braces or tension braces is required to support the boom between its wheel units to prevent sagging or breaking.

The present invention is an economical compromise between the massive and expensive linear traversing irrigators of the prior art and mere stationary or rotary sprinkler heads on small garden variety mobile units or fixed installations. The invention provides a greatly simplified and much less expensive traversing type irrigator which can traverse a path of up to fifty feet in width where row crops are planted. The apparatus can conveniently supply double irrigation in a back-and-forth mode of operation to a swath of the stated width while connected through its hose to a fixed supply pipe or hose running across the center of a field. Other operational modes are possible, as will be described, and the apparatus is quite flexible in its usage. It fulfills a need in the art which is not satisfied by existing available equipment.

BRIEF DESCRIPTION OF DRAWING FIGURES

DETAILED DESCRIPTION

Figure 1:
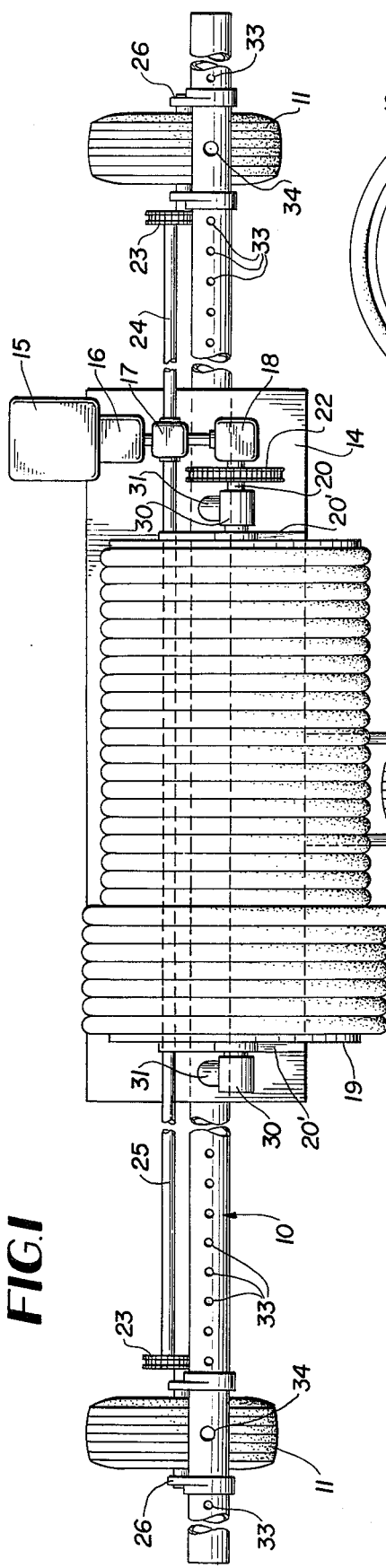
FIG. 1 is a plan view of an agricultural irrigation apparatus embodying the invention.
Figure 2:
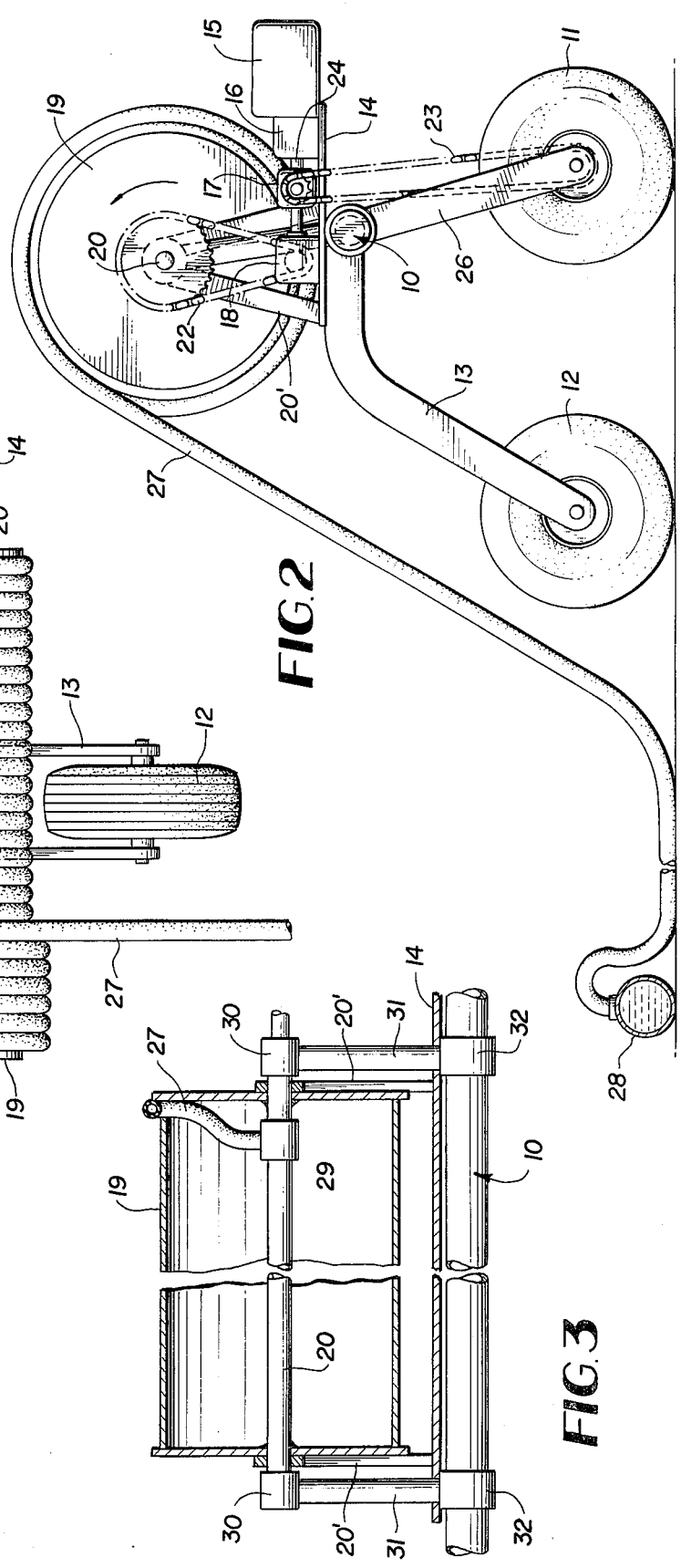
FIG. 2 is a side elevation thereof.
Figure 3:
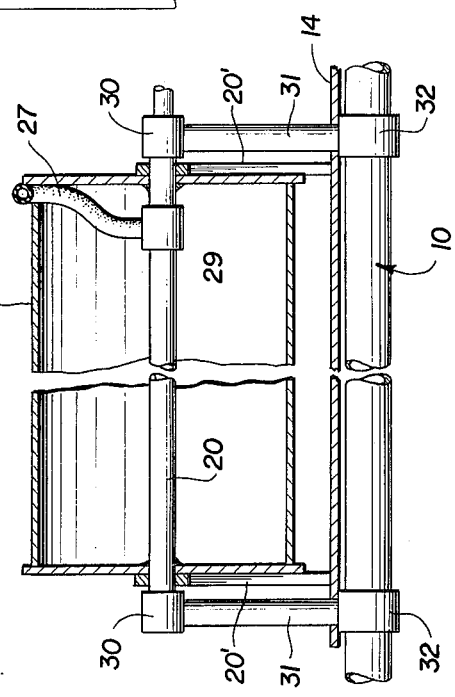
FIG. 3 is a fragmentary vertical section taken through a hose reel, partly in elevation.

Referring to the drawings in detail, wherein like numerals designate like parts, a horizontal closed end tubular irrigation boom 10 having a length in the range of 35 to 50 feet constitutes the body of the apparatus on which all other components are mounted or attached. A pair of widely spaced traction wheels 11 are disposed below the boom 10 in supportive relation thereto and a single trailing stabilizer wheel 12 is disposed midway between the traction wheels and journaled on the lower end of an arm structure or yoke 13 which is rigidly attached to the boom 10 at its longitudinal center.

A horizontal platform 14 rigidly secured to the boom 10 and yoke 13 supports an internal combustion engine 15 having a first transmission or gear box 16 to supply power through a gear differential 17 to the two traction wheels 11. A second gear box 18 on the platform 14 and operatively coupled with the gear differential 17 supplies power to turn an overhead hose reel 19 on its horizontal support shaft 20 which is above and parallel to the boom 10. The shaft 20 and reel 19 are supported by a pair of upstanding frames 20' fixed on and rising from the platform 14.

Vertical drive gearing 22 coupled with the second gear box 18 delivers power to the rotational drive shaft 20 of the hose reel 19. Simultaneously, rotational power in the opposite direction is delivered to the two traction wheels 11 by vertical gearing 23 coupled with the drive axles of the wheels 11 and also operatively connected with opposite sides of the gear differential 17 through horizontal drive shafts 24 and 25. The traction wheels 11 are also connected in supportive relationship to the boom 10 by struts 26 or yokes. Thus, the boom is supported at the proper elevation by the three wheels 11 and 12 through the elements 13 and 26. The structure of the apparatus is very simplified and compact and its overall length axially of the boom 10 is such that it requires no truss bracing as is commonly required on the very long machines of the prior art.

Conventional gear shift means, not shown, is provided on the gear boxes 16 and 18 to enable the drive to be reversed, and in the case of the second gear box 18 to change the speed of rotation of the hose reel 19 to compensate for the change in diameter as the long hose 27 is wound thereon or unwound therefrom. The hose 27, as shown in FIG. 1, is coiled on the reel 19 in multiple layers, thus allowing the use of a shorter reel to accommodate the required length of hose. One end of the hose is suitably coupled to a fixed water source 28 in the field such as a rigid supply pipe or hose which spans the field transversely of the normal line of travel of the apparatus. This enables the apparatus to move away from the source 28 in a linear path toward one edge of the field, and then to reverse its movement and travel back to the source 28, thus giving double irrigation to the field over a swath of 35 to 50 feet in width. The wheels 11 and 12 during this movement can run in furrows between rows of crops.

The apparatus can then be shifted laterally to a new position along the source 28 and can make a further traverse across one-half of the field, and so on, until one-half of the field receives a double irrigation treatment. When the apparatus is moved laterally, new connections between the hose 27 and the source pipe or hose 28 are made. The apparatus can then be turned and moved to the other side of the source 28, and the described multiple traverses of the other half of the field are carried out in the described manner until the field is completely irrigated.

In some cases, the pipe or hose 28 may lie along one edge of the field and the apparatus can move away from the source and traverse the entire field back-and-forth from its far edge. This mode of operation would be used on smaller fields. Still another mode of use is possible. In lieu of the supply pipe or hose 28, a single standpipe, not shown, at the center of the field or near one corner thereof can supply water to a very large hose storage reel, not shown, and the hose of this reel can be coupled to the hose 27. This arrangement renders the mobility of the apparatus less restricted and more flexible, as will be readily understood.

More particularly, when the apparatus is employed with a fixed supply pipe 28 or hose, as illustrated, as the apparatus propels itself away from the stationary source 28, the hose 27 will be laid out on the ground behind the moving apparatus, while water under low pressure is constantly supplied through the hose 27. The other end of the hose 27 is coupled through a swivel fitting 29 which surrounds the rotary shaft 20 which is tubular at least in the region of the hose reel 19. The tubular rotary shaft 20 is connected through another pair of sealed swivel fittings 30 with tubular arms 31 leading to the tubular boom 10 and coupled therewith by sealed fittings 32. In this manner, irrigation water delivered from the source 28 through the hose 27 can reach the boom 10 via the hollow shaft 20 and the arms 31. The swivel fittings 29 and 30 which are conventional devices allow the tubular shaft 20 to rotate with the hose reel 19 while maintaining a flow path for the water to the irrigation boom 10.

As shown in FIG. 1, the boom 10 has groups of irrigating apertures 33 at desired locations along the boom 10 and on opposite sides of the wheels 11 so that low pressure water streams can cascade down from the boom on the crop rows on opposite sides of the furrows in which the wheels 11 run. Larger openings 34 directly above the wheels 11 may also be provided in the boom 10 for further irrigation within the furrows, if needed. The openings 34 may be plugged, if desired, with removable plugs. The number, location and spacing of irrigation apertures along the boom 10 may be varied in the invention to meet particular needs. As the ends of the boom 10 are closed, it can be understood that, in essence, the boom is simply an elongated tank for irrigation water under low pressure enabling such water to be discharged over a swath of up to fifty feet, as explained.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A mobile irrigation apparatus comprising a closed end apertured irrigation boom, wheeled carriage means supporting the boom substantially horizontally and including widely spaced traction wheels, a hose reel mounted above said boom on a rotational axis parallel to the boom and being supported by the boom, power drive means supported on the boom and operatively coupled with the traction wheels and hose reel to drive the same simultaneously in opposite directions of rotation, a hose coiled on the hose reel and adapted to have one end coupled with a source of water in a field to be irrigated, and conduit means interconnecting the other end of the hose on the hose reel with the interior of the apertured irrigation boom, said conduit means comprising a tubular drive shaft section for the hose reel having a swiveled connection with said other end of the hose, and tubular arms having swiveled connections with the tubular drive shaft and receiving irrigation water through the drive shaft section from the hose, said tubular arms being connected to said apertured boom and delivering irrigation water to the interior thereof.

2. A mobile irrigation apparatus comprising a closed end apertured irrigation boom, wheeled carriage means supporting the boom substantially horizontally and including widely spaced traction wheels, a hose reel mounted above said boom on a rotational axis parallel to the boom and being supported by the boom, power drive means supported on the boom and operatively coupled with the traction wheels and hose reel to drive the same simultaneously in opposite directions of rotation, a hose coiled on the hose reel and adapted to have one end coupled with a source of water in a field to be irrigated, and conduit means interconnecting the other end of the hose on the hose reel with the interior of the apertured irrigation boom, said power drive means comprising an engine, a first gear transmission coupled with and driven by the engine, a gear differential coupled with an output shaft of the first gear transmission, a second gear transmission coupled with an output shaft of the gear differential, first gear train means connected with output shafts of the gear differential and connected with said traction wheels to drive the same simultaneously in one direction, and second gear train means connected with and driven by the second transmission and operatively coupled to said hose reel to drive the same in unison with said traction wheels in a reverse direction of rotation from the rotation of the traction wheels.

3. A mobile irrigation apparatus as defined in claim 2, and a horizontal platform on said boom supporting said engine, first and second gear transmissions and said gear differential.

4. A mobile irrigation apparatus as defined in claim 2, and said first gear train means comprising a pair of vertical chain drives operatively connected with said traction wheels and connected with and driven by oppositely extending output shafts of said gear differential which are parallel to said boom and to the axis of the hose reel.

* * * * *